United States Patent
Yang et al.

(10) Patent No.: US 10,742,360 B2
(45) Date of Patent: Aug. 11, 2020

(54) LAYER MAPPING, CSI FEEDBACK AND HARQ FEEDBACK IN MOBILE COMMUNICATIONS

(71) Applicant: MediaTek Inc., Hsinchu (TW)

(72) Inventors: Weidong Yang, San Diego, CA (US); Lung-Sheng Tsai, Hsinchu (TW); Tzu-Han Chou, San Jose, CA (US); Yu-Chuan Lin, Hsinchu (TW); Bo-Si Chen, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 15/952,661

(22) Filed: Apr. 13, 2018

(65) Prior Publication Data

US 2018/0302192 A1    Oct. 18, 2018

Related U.S. Application Data

(60) Provisional application No. 62/485,407, filed on Apr. 14, 2017.

(51) Int. Cl.
| | |
|---|---|
| H04L 1/18 | (2006.01) |
| H04B 7/04 | (2017.01) |
| H04L 1/16 | (2006.01) |
| H04B 7/06 | (2006.01) |
| H04W 72/04 | (2009.01) |
| H04B 7/0456 | (2017.01) |

(Continued)

(52) U.S. Cl.
CPC ......... *H04L 1/1812* (2013.01); *H04B 7/0473* (2013.01); *H04B 7/0478* (2013.01);
(Continued)

(58) Field of Classification Search
None
See application file for complete search history.

(56) References Cited

U.S. PATENT DOCUMENTS

| | | |
|---|---|---|
| 2012/0106470 A1 | 5/2012 | Clerckx et al. |
| 2013/0089040 A1 | 4/2013 | Tabet et al. |

(Continued)

FOREIGN PATENT DOCUMENTS

| | | |
|---|---|---|
| CN | 103825674 A | 5/2014 |
| WO | WO 2016089124 A1 | 6/2016 |

OTHER PUBLICATIONS

State Intellectual Property Office, International Search Report and Written Opinion for International Application No. PCT/CN2018/083188, dated Jul. 9, 2018.

(Continued)

*Primary Examiner* — Yemane Mesfin
*Assistant Examiner* — Jeff Banthrongsack
(74) *Attorney, Agent, or Firm* — Han IP PLLC; Andy M. Han

(57) ABSTRACT

Techniques and examples of layer mapping, channel state information (CSI) feedback and hybrid automatic repeat request (HARQ) feedback in mobile communications are described. A user equipment (UE) receives from a base station one or more reference signals, which may be non-zero power (NZP) or zero power (ZP), on one or more time-frequency resources indicated by a network via a communication link between the UE and the base station. The UE estimates, based on the receiving, a subspace spanned by a channel response of an interfering signal. The UE determines a precoding matrix indicator (PMI) based on the estimated subspace. The UE transmits to the base station a channel state information (CSI) feedback comprising at least the PMI. The PMI may include at least a first precoder and a second precoder.

17 Claims, 6 Drawing Sheets

(52) U.S. Cl.
CPC ......... *H04B 7/0626* (2013.01); *H04L 1/1671* (2013.01); *H04L 1/1864* (2013.01); *H04W 72/046* (2013.01)

(56) References Cited

U.S. PATENT DOCUMENTS

| | | | | |
|---|---|---|---|---|
| 2013/0107849 | A1* | 5/2013 | Park | H04B 7/0417 370/329 |
| 2014/0256341 | A1* | 9/2014 | Nayeb Nazar | H04W 72/082 455/452.1 |
| 2015/0049713 | A1* | 2/2015 | Lan | H04L 25/0224 370/329 |
| 2015/0098516 | A1* | 4/2015 | Wang | H04L 25/03949 375/267 |
| 2016/0173232 | A1* | 6/2016 | Mallik | H04L 1/0009 714/800 |
| 2016/0337178 | A1 | 11/2016 | Frenne et al. | |
| 2016/0374099 | A1* | 12/2016 | Cui | H04W 24/10 |

OTHER PUBLICATIONS

Qualcomm Incorporated, Views on CSI enhancements for MU-MIMO, 3GPP TSG-RAN WG1 #84bis, Busan, Korea, Apr. 11-15, 2016.

Taiwan Intellectual Property Office, Office Action for Taiwan Patent Application No. 107112892, dated Apr. 23, 2019.

\* cited by examiner

| | Layer 1 | Layer 2 | Layer 3 | Layer 4 |
|---|---|---|---|---|
| Subcarrier 0 | b(0,0):b(0,3) | b(0,4):b(0,7) | b(16,0):b(16,3) | b(16,4):b(16,7) |
| Subcarrier 1 | b(0,8):b(0,11) | b(0,12):b(0,15) | b(16,8):b(16,11) | b(16,12):b(16,15) |
| Subcarrier 2 | b(0,16):b(0,19) | b(0,20):b(0,23) | b(16,16):b(16,19) | b(16,20):b(16,23) |
| Subcarrier 3 | b(0,24):b(0,27) | b(0,28):b(0,31) | b(16,24):b(16,27) | b(16,28):b(16,31) |
| Subcarrier 4 | b(1,0):b(1,3) | b(1,4):b(1,7) | b(17,0):b(17,3) | b(17,4):b(17,7) |
| Subcarrier 5 | b(1,8):b(1,11) | b(1,12):b(1,15) | b(17,8):b(17,11) | b(17,12):b(17,15) |
| Subcarrier 6 | b(1,16):b(1,19) | b(1,20):b(1,23) | b(17,16):b(17,19) | b(17,20):b(17,23) |
| Subcarrier 7 | b(1,24):b(1,27) | b(1,28):b(1,31) | b(17,24):b(17,27) | b(17,28):b(17,31) |
| Subcarrier 8 | b(2,0):b(2,3) | b(2,4):b(2,7) | b(18,0):b(18,3) | b(18,4):b(18,7) |
| Subcarrier 9 | b(2,8):b(2,11) | b(2,12):b(2,15) | b(18,8):b(18,11) | b(18,12):b(18,15) |
| Subcarrier 10 | b(2,16):b(2,19) | b(2,20):b(2,23) | b(18,16):b(18,19) | b(18,20):b(18,23) |
| Subcarrier 11 | b(2,24):b(2,27) | b(2,28):b(2,31) | b(18,24):b(18,27) | b(18,28):b(18,31) |
| Subcarrier 12 | b(3,0):b(3,3) | b(3,4):b(3,7) | b(19,0):b(19,3) | b(19,4):b(19,7) |
| Subcarrier 13 | b(3,8):b(3,11) | b(3,12):b(3,15) | b(19,8):b(19,11) | b(19,12):b(19,15) |
| Subcarrier 14 | b(3,16):b(3,19) | b(3,20):b(3,23) | b(19,16):b(19,19) | b(19,20):b(19,23) |
| Subcarrier 15 | b(3,24):b(3,27) | b(3,28):b(3,31) | b(19,24):b(19,27) | b(19,28):b(19,31) |
| Subcarrier 16 | b(4,0):b(4,3) | b(4,4):b(4,7) | b(20,0):b(20,3) | b(20,4):b(20,7) |
| Subcarrier 17 | b(4,8):b(4,11) | b(4,12):b(4,15) | b(20,8):b(20,11) | b(20,12):b(20,15) |
| Subcarrier 18 | b(4,16):b(4,19) | b(4,20):b(4,23) | b(20,16):b(20,19) | b(20,20):b(20,23) |
| Subcarrier 19 | b(4,24):b(4,27) | b(4,28):b(4,31) | b(20,24):b(20,27) | b(20,28):b(20,31) |
| Subcarrier 20 | b(5,0):b(5,3) | b(5,4):b(5,7) | b(21,0):b(21,3) | b(21,4):b(21,7) |
| Subcarrier 21 | b(5,8):b(5,11) | b(5,12):b(5,15) | b(21,8):b(21,11) | b(21,12):b(21,15) |
| Subcarrier 22 | b(5,16):b(5,19) | b(5,20):b(5,23) | b(21,16):b(21,19) | b(21,20):b(21,23) |
| Subcarrier 23 | b(5,24):b(5,27) | b(5,28):b(5,31) | b(21,24):b(21,27) | b(21,28):b(21,31) |
| Subcarrier 24 | b(6,0):b(6,3) | b(6,4):b(6,7) | b(22,0):b(22,3) | b(22,4):b(22,7) |
| Subcarrier 25 | b(6,8):b(6,11) | b(6,12):b(6,15) | b(22,8):b(22,11) | b(22,12):b(22,15) |
| Subcarrier 26 | b(6,16):b(6,19) | b(6,20):b(6,23) | b(22,16):b(22,19) | b(22,20):b(22,23) |
| Subcarrier 27 | b(6,24):b(6,27) | b(6,28):b(6,31) | b(22,24):b(22,27) | b(22,28):b(22,31) |
| Subcarrier 28 | b(7,0):b(7,3) | b(7,4):b(7,7) | b(23,0):b(23,3) | b(23,4):b(23,7) |
| Subcarrier 29 | b(7,8):b(7,11) | b(7,12):b(7,15) | b(23,8):b(23,11) | b(23,12):b(23,15) |
| Subcarrier 30 | b(7,16):b(7,19) | b(7,20):b(7,23) | b(23,16):b(23,19) | b(23,20):b(23,23) |
| Subcarrier 31 | b(7,24):b(7,27) | b(7,28):b(7,31) | b(23,24):b(23,27) | b(23,28):b(23,31) |

100

OFDM Symbol 0

FIG. 1

| | Layer 1 | Layer 2 | Layer 3 | Layer 4 |
|---|---|---|---|---|
| Subcarrier 0 | b(8,0):b(8,3) | b(8,4):b(8,7) | b(24,0):b(24,3) | b(24,4):b(24,7) |
| Subcarrier 1 | b(8,8):b(8,11) | b(8,12):b(8,15) | b(24,8):b(24,11) | b(24,12):b(24,15) |
| Subcarrier 2 | b(8,16):b(8,19) | b(8,20):b(8,23) | b(24,16):b(24,19) | b(24,20):b(24,23) |
| Subcarrier 3 | b(8,24):b(8,27) | b(8,28):b(8,31) | b(24,24):b(24,27) | b(24,28):b(24,31) |
| Subcarrier 4 | b(9,0):b(9,3) | b(9,4):b(9,7) | b(25,0):b(25,3) | b(25,4):b(25,7) |
| Subcarrier 5 | b(9,8):b(9,11) | b(9,12):b(9,15) | b(25,8):b(25,11) | b(25,12):b(25,15) |
| Subcarrier 6 | b(9,16):b(9,19) | b(9,20):b(9,23) | b(25,16):b(25,19) | b(25,20):b(25,23) |
| Subcarrier 7 | b(9,24):b(9,27) | b(9,28):b(9,31) | b(25,24):b(25,27) | b(25,28):b(25,31) |
| Subcarrier 8 | b(10,0):b(10,3) | b(10,4):b(10,7) | b(26,0):b(26,3) | b(26,4):b(26,7) |
| Subcarrier 9 | b(10,8):b(10,11) | b(10,12):b(10,15) | b(26,8):b(26,11) | b(26,12):b(26,15) |
| Subcarrier 10 | b(10,16):b(10,19) | b(10,20):b(10,23) | b(26,16):b(26,19) | b(26,20):b(26,23) |
| Subcarrier 11 | b(10,24):b(10,27) | b(10,28):b(10,31) | b(26,24):b(26,27) | b(26,28):b(26,31) |
| Subcarrier 12 | b(11,0):b(11,3) | b(11,4):b(11,7) | b(27,0):b(27,3) | b(27,4):b(27,7) |
| Subcarrier 13 | b(11,8):b(11,11) | b(11,12):b(11,15) | b(27,8):b(27,11) | b(27,12):b(27,15) |
| Subcarrier 14 | b(11,16):b(11,19) | b(11,20):b(11,23) | b(27,16):b(27,19) | b(27,20):b(27,23) |
| Subcarrier 15 | b(11,24):b(11,27) | b(11,28):b(11,31) | b(27,24):b(27,27) | b(27,28):b(27,31) |
| Subcarrier 16 | b(12,0):b(12,3) | b(12,4):b(12,7) | b(28,0):b(28,3) | b(28,4):b(28,7) |
| Subcarrier 17 | b(12,8):b(12,11) | b(12,12):b(12,15) | b(28,8):b(28,11) | b(28,12):b(28,15) |
| Subcarrier 18 | b(12,16):b(12,19) | b(12,20):b(12,23) | b(28,16):b(28,19) | b(28,20):b(28,23) |
| Subcarrier 19 | b(12,24):b(12,27) | b(12,28):b(12,31) | b(28,24):b(28,27) | b(28,28):b(28,31) |
| Subcarrier 20 | b(13,0):b(13,3) | b(13,4):b(13,7) | b(29,0):b(29,3) | b(29,4):b(29,7) |
| Subcarrier 21 | b(13,8):b(13,11) | b(13,12):b(13,15) | b(29,8):b(29,11) | b(29,12):b(29,15) |
| Subcarrier 22 | b(13,16):b(13,19) | b(13,20):b(13,23) | b(29,16):b(29,19) | b(29,20):b(29,23) |
| Subcarrier 23 | b(13,24):b(13,27) | b(13,28):b(13,31) | b(29,24):b(29,27) | b(29,28):b(29,31) |
| Subcarrier 24 | b(14,0):b(14,3) | b(14,4):b(14,7) | b(30,0):b(30,3) | b(30,4):b(30,7) |
| Subcarrier 25 | b(14,8):b(14,11) | b(14,12):b(14,15) | b(30,8):b(30,11) | b(30,12):b(30,15) |
| Subcarrier 26 | b(14,16):b(14,19) | b(14,20):b(14,23) | b(30,16):b(30,19) | b(30,20):b(30,23) |
| Subcarrier 27 | b(14,24):b(14,27) | b(14,28):b(14,31) | b(30,24):b(30,27) | b(30,28):b(30,31) |
| Subcarrier 28 | b(15,0):b(15,3) | b(15,4):b(15,7) | b(31,0):b(31,3) | b(31,4):b(31,7) |
| Subcarrier 29 | b(15,8):b(15,11) | b(15,12):b(15,15) | b(31,8):b(31,11) | b(31,12):b(31,15) |
| Subcarrier 30 | b(15,16):b(15,19) | b(15,20):b(15,23) | b(31,16):b(31,19) | b(31,20):b(31,23) |
| Subcarrier 31 | b(15,24):b(15,27) | b(15,28):b(15,31) | b(31,24):b(31,27) | b(31,28):b(31,31) |

OFDM Symbol 1

RECEIVE, BY A PROCESSOR OF A USER EQUIPMENT (UE), FROM A BASE STATION ONE OR MORE REFERENCE SIGNALS, WHICH ARE NON-ZERO POWER OR ZERO POWER, ON ONE OR MORE TIME-FREQUENCY RESOURCES INDICATED BY A NETWORK VIA A COMMUNICATION LINK BETWEEN THE UE AND THE BASE STATION
410

ESTIMATE, BY THE PROCESSOR BASED ON THE RECEIVING, A SUBSPACE SPANNED BY A CHANNEL RESPONSE OF AN INTERFERING SIGNAL
420

DETERMINE, BY THE PROCESSOR, A PRECODING MATRIX INDICATOR (PMI) BASED ON THE ESTIMATED SUBSPACE, THE PMI COMPRISING AT LEAST A FIRST PRECODER AND A SECOND PRECODER
430

TRANSMIT, BY THE PROCESSOR, TO THE BASE STATION A CHANNEL STATE INFORMATION (CSI) FEEDBACK COMPRISING AT LEAST THE PMI
440

```
┌─────────────────────────────────────────────────────────────┐
│  RECEIVE, BY A PROCESSOR OF A USER EQUIPMENT (UE), FROM A   │
│  BASE STATION ONE OR MORE REFERENCE SIGNALS, WHICH ARE      │
│  NON-ZERO POWER OR ZERO POWER, ON ONE OR MORE               │
│  TIME-FREQUENCY RESOURCES INDICATED BY A NETWORK VIA A      │
│  COMMUNICATION LINK BETWEEN THE UE AND THE BASE STATION     │
│  WITH DYNAMIC TIME-DIVISION DUPLEXING (TDD)                 │
│                          510                                │
└─────────────────────────────────────────────────────────────┘
                              │
                              ▼
┌─────────────────────────────────────────────────────────────┐
│  DETERMINE, BY THE PROCESSOR, FIRST CHANNEL STATE           │
│  INFORMATION (CSI) COMPRISING RANK INDICATION (RI),         │
│  PRECODING MATRIX INDICATOR (PMI) AND CHANNEL QUALITY       │
│  INDICATOR (CQI) FOR A PLURALITY OF TIME SLOTS ASSOCIATED   │
│  WITH A FIRST SLOT TYPE USED FOR THE DYNAMIC TDD            │
│                          520                                │
└─────────────────────────────────────────────────────────────┘
                              │
                              ▼
┌─────────────────────────────────────────────────────────────┐
│  DETERMINE, BY THE PROCESSOR, SECOND CSI COMPRISING RI,     │
│  PMI AND CQI FOR A PLURALITY OF TIME SLOTS ASSOCIATED WITH  │
│  A SECOND SLOT TYPE USED FOR THE DYNAMIC TDD                │
│                          530                                │
└─────────────────────────────────────────────────────────────┘
                              │
                              ▼
┌─────────────────────────────────────────────────────────────┐
│  TRANSMIT, BY THE PROCESSOR, TO THE BASE STATION A CSI      │
│  FEEDBACK INDICATING THE FIRST CSI AND THE SECOND CSI       │
│                          540                                │
└─────────────────────────────────────────────────────────────┘
```

TRANSMIT, BY A PROCESSOR OF A BASE STATION, TO A USER EQUIPMENT (UE) ONE OR MORE REFERENCE SIGNALS, WHICH ARE NON-ZERO POWER OR ZERO POWER, ON ONE OR MORE TIME-FREQUENCY RESOURCES INDICATED BY A NETWORK VIA A COMMUNICATION LINK BETWEEN THE UE AND THE BASE STATION WITH DYNAMIC TIME-DIVISION DUPLEXING (TDD)
610

RECEIVE, BY THE PROCESSOR, FROM THE UE A CHANNEL STATE INFORMATION (CSI) FEEDBACK COMPRISING AT LEAST A PRECODING MATRIX INDICATOR (PMI)

- THE PMI COMPRISING AT LEAST A FIRST PRECODER AND A SECOND PRECODER
- THE FIRST PRECODER BEING APPROXIMATELY PARALLEL TO A CHANNEL RESPONSE OF AN INTERFERING SIGNAL
- THE SECOND PRECODER BEING APPROXIMATELY ORTHOGONAL TO THE CHANNEL RESPONSE OF THE INTERFERING SIGNAL

LAYER MAPPING, CSI FEEDBACK AND HARQ FEEDBACK IN MOBILE COMMUNICATIONS

CROSS REFERENCE TO RELATED PATENT APPLICATION

The present disclosure claims the priority benefit of U.S. Provisional Patent Application No. 62/485,407, filed on 14 Apr. 2017, the content of which is herein incorporated by reference in its entirety.

TECHNICAL FIELD

The present disclosure is generally related to mobile communications and, more particularly, to layer mapping, channel state information (CSI) feedback and hybrid automatic repeat request (HARQ) feedback in mobile communications.

BACKGROUND

Unless otherwise indicated herein, approaches described in this section are not prior art to the claims listed below and are not admitted as prior art by inclusion in this section.

In wireless communications, the receiver model can be represented by the expression below.

$$r = \underbrace{HP_1}_{H_1} x_1 + \underbrace{HP_2}_{H_2} x_2 + G_0 y + n,$$

Here, H denotes the channel response between a base station and a user equipment (UE), $H_k$ denotes the effective channel response including precoder $P_k$ for $x_k$, $G_0$ denotes the channel response including possible precoder for interfering signal y, and n denotes a spatially white noise with standard deviation at 1. In the setup of dynamic time-division duplexing (TDD), interfering signal y is often an uplink (UL) signal from a UE near the UE of interest rather than a downlink (DL) signal from another cell as found in conventional interference scenarios. In other words, interfering signal y is due to cross-link interference.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of a UE receiving from a base station one or more reference signals, which may be non-zero power (NZP) or zero power (ZP), on one or more time-frequency resources indicated by a network via a communication link between the UE and the base station. The method may also involve the processor estimating, based on the receiving, a subspace spanned by a channel response of an interfering signal. The method may further involve the processor determining a precoding matrix indicator (PMI) based on the estimated subspace. The method may additionally involve the processor transmitting to the base station a channel state information (CSI) feedback comprising at least the PMI. The PMI may include at least a first precoder and a second precoder.

In one aspect, a method may involve a processor of a UE receiving from a base station one or more reference signals, which may be non-zero power (NZP) or zero power (ZP), on one or more time-frequency resources indicated by a network via a communication link between the UE and the base station with dynamic TDD. The method may also involve the processor determining first channel state information (CSI) comprising rank indication (RI), PMI and channel quality indicator (CQI) for a plurality of time slots associated with a first slot type used for the dynamic TDD. The method may further involve the processor determining second CSI comprising RI, PMI and CQI for a plurality of time slots associated with a second slot type used for the dynamic TDD. The method may additionally involve the processor transmitting to the base station a CSI feedback indicating the first CSI and the second CSI.

In one aspect, a method may involve a processor of a base station transmitting to a UE one or more reference signals, which may be non-zero power (NZP) or zero power (ZP), on one or more time-frequency resources indicated by a network via a communication link between the UE and the base station with dynamic TDD. The method may also involve the processor receiving from the UE a CSI feedback comprising at least a PMI. The PMI may include at least a first precoder and a second precoder. The first precoder may be approximately parallel to a channel response of an interfering signal. The second precoder may be approximately orthogonal to the channel response of the interfering signal.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR) and Internet-of-Things (IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 1 is a diagram of an example scenario of codeblock mapping over a symbol in accordance with an implementation of the present disclosure.

FIG. 2 is a diagram of an example scenario of codeblock mapping over a symbol in accordance with an implementation of the present disclosure.

FIG. 4 is a flowchart of an example process in accordance with an implementation of the present disclosure.

FIG. 5 is a flowchart of an example process in accordance with an implementation of the present disclosure.

FIG. 6 is a flowchart of an example process in accordance with an implementation of the present disclosure.

DETAILED DESCRIPTION OF PREFERRED EMBODIMENTS

Figure 3:
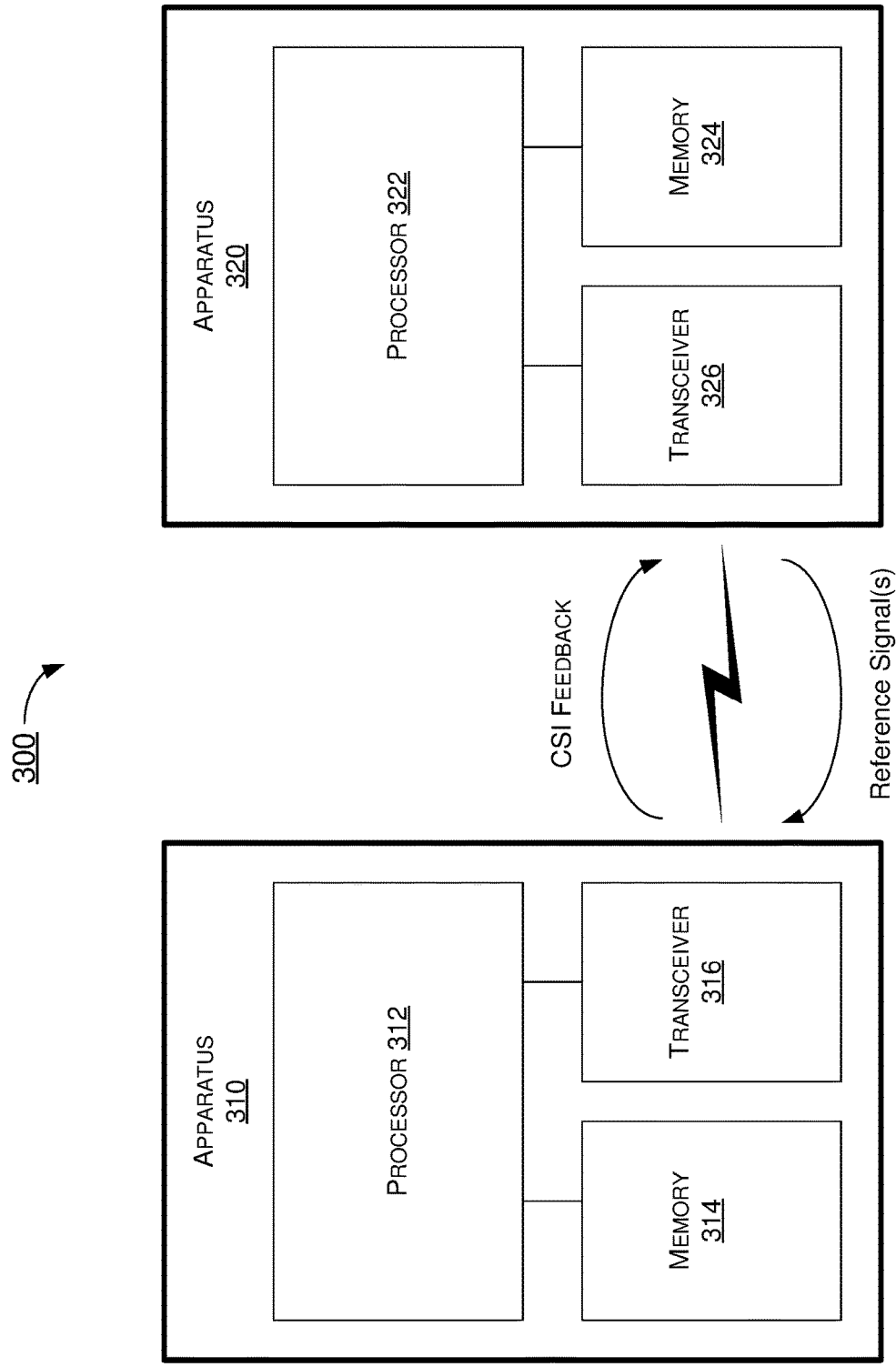
FIG. 3 is a block diagram of an example system in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

With Minimum Mean Square Error-Interference Rejection Combining (MMSE-IRC) receivers, the signal-to-interference-plus-noise ratio (SINR) for $x_1$ can be represented by the expression below.

$$SINR_1 = |H_1|^2 - \frac{|H_1^H G_0|^2}{|G_0|^2 + 1} - \frac{\left|H_1^H H_2 - \frac{H_1^H G_0 G_0^H H_2}{|G_0|^2+1}\right|^2}{|H_2|^2 - \frac{|H_2^H G_0|^2}{|G_0|^2+1} + 1}$$

SINR for $x_1$

The signal level of cross-link interference y can be much higher than that for $x_k$. In the above expression, it is assumed that the following are true:

1) $G_0 = g_0 G$, where $g_0 \geq 0$, G is a vector of unit norm;
2) $H_1 = a_1 U + b_1 G$, where $a_1 \geq 0$ is a properly chosen U, with U being a vector of unit norm and $U \perp G$; and
3) $H_2 = a_2 U + b_2 G + cV$, where $c \geq 0$ is for a properly chosen unit vector V, $V \perp U$, $V \perp G$ is for more than two receivers at the UE, and when two receivers are used at the UE, V does not exist.

With the factorization above, the channel response for different spatial layers may be expressed as a sum of projections along the channel response of the interferer and vectors orthogonal to that channel response. The SINR for $x_1$ can be represented by the expression below, assuming $c=0$.

$$SINR_1 = |H_1|^2 - \frac{|b_1 g_0|^2}{|G_0|^2+1} - \frac{\left|a_1^* a_2 + b_1^* b_2 - \frac{b_1^* g_0 g_0^* b_2}{|G_0|^2+1}\right|^2}{|H_2|^2 - \frac{|g_0 b_2|^2}{|G_0|^2+1} + 1}$$

$$= |H_1|^2 - \frac{|b_1 g_0|^2}{|G_0|^2+1} - \frac{\left|a_1^* a_2 + \frac{b_1^* b_2}{|G_0|^2+1}\right|^2}{|H_2|^2 - \frac{|g_0 b_2|^2}{|G_0|^2+1} + 1}$$

$$\approx |H_1|^2 - |b_1|^2 - \frac{|a_1 a_2|^2}{|H_2|^2 - |b_2|^2 + 1} \text{ when } g_0 \text{ is very large}$$

$$= a_1^2 - \frac{|a_1 a_2|^2}{|a_2|^2 + c^2 + 1}$$

$$= \frac{a_1^2(c^2+1)}{|a_2|^2 + c^2 + 1}$$

With two receivers at the UE, the SINR for $x_1$ can be represented by the expression below.

$$SINR_1 = \frac{a_1^2}{\underbrace{\frac{|a_2|^2}{\langle|H_2,U\rangle|^2\text{: projection of } x_2 \text{ along a subspace (U) orthogonal to G}}}_{\langle|H_1,U\rangle|^2\text{: projection of } x_1 \text{ along a subspace (U) orthogonal to G}} + 1}$$

Similarly, in general, the SINR for $x_2$ can be represented by the expression below.

$$SINR_2 = (|a_2|^2 + c_2) - \frac{|a_1 a_2|^2}{a_1^2 + 1}$$

$$= \frac{|a_2|^2}{a_1^2 + 1} + c^2$$

With two receivers at the UE, the SINR for $x_2$ can be represented by the expression below.

$$SINR_2 = \frac{|a_2|^2}{a_1^2 + 1}.$$

From the above derivation, it can be seen that with the presence of a strong interfering signal, the effect of the MMSE-IRC weight is to project the received signals to a direction perpendicular to the channel response G of the interfering signal. It can also be seen that, for higher ranks, a similar behavior can be observed. That is, the received signals are projected into a subspace orthogonal to the subspace spanned by the channel responses of the interfering signals.

As $H_k$ is a composite of H and $P_k$, the projection at the receiver may be controlled. In other words, what $a_1$ and $a_2$ will be may be controlled through the selection of $P_k$.

With respect to identifying an optimal transmission strategy, a reasonable metric may be the sum rate for two spatial layers. The sum rate for two spatial layers can be represented by the expression below.

$$\log_2(1 + SINR_1) + \log_2(1 + SINR_2) = \log_2 \frac{(|a_1|^2 + |a_2|^2 + 1)^2}{(|a_1|^2 + 1)(|a_2|^2 + 1)},$$

Here, $|a_1|^2 + |a_2|^2 = $ constant. For instance, $[P_1 \ P_2]$ is a unitary matrix, and the sum rate is maximized or optimized at $a_1 = 0$ and $a_2 = 0$.

MIMO CSI Feedback Considering Dynamic TDD

With dynamic TDD, when present, cross-link interference (CLI) can substantially reduce the SINRs for some spatial layers, which leads to a high frame error rate (FER) for first transmissions. When CLI is not present, the interference scenario is similar to conventional interference scenarios (although some remote UEs can still perform UL transmissions while the UE of interest performs DL reception). The transmitted signals from the desired cell can be received with a high success rate, e.g., with a FER for first transmissions at 10 percent. Accordingly, it would be ideal that CSI feedback for dynamic TDD, especially CSI feedback for time slots with flexible transmission directions, could provide the base station with CSI information under at least two approaches in accordance with the present disclosure for two interference scenarios.

Under a first approach in accordance with the present disclosure, for CSI acquisition, two CSI processes (e.g., process 1 and process 2) may be configured for a UE, with process 1 targeting a conventional scenario and process 2 targeting a CLI scenario. For each scenario, according to the dominant interference (assuming no abrupt change), CSI including rank indication (RI), precoding matrix indicator (PMI) and channel quality indicator (CQI) may be calculated or otherwise determined and fed back by a UE to the base station. Under the first approach each CSI may be derived from a specific type of time slots. For example, with process 1 the CSI may be derived over time slots with DL only traffic in the network (or time slots with a light CLI), and with process 2 the CSI may be derived over time slots with heavy and/or CLI interference. Moreover, the slot type may be derived from common/group common physical downlink control channel (PDCCH) transmitted which can indicate the slot type for each time slot of a number of time slots. Alternatively, the slot type for each time slot of a number of time slots may be derived from radio resource control (RRC) signaling.

Under a second approach in accordance with the present disclosure, one CSI process may be configured at a UE. Restriction on interference measurement and/or channel measurement may be applied for CSI measurement. In case when interference measurement is restricted, the interference measurement may be restricted to time slots from one specific type as described above. From that, the base station may map the CSI measured at different times according to slot types, and the base station may utilize the CSI in its scheduling decision. For example, CSI 1 may be associated with interference measured in time slot 1 with light CLI, and CSI 2 may be associated with interference measured in time slot 2 with heavy CLI.

With the above-described two approaches, the base station may handle interference due to dynamic TDD in an event that the CLI is relatively static. However, in a wireless network (e.g., a LTE network or a NR network) operating with dynamic TDD, the CLI may change rather abruptly. The scheduler residing at the base station may also consider combining the CSI feedbacks from UEs in the wireless network to handle dynamic interference. Yet, it may happen that $PMI_1$ from process 1 can be different from $PMI_2$ from process 2, and the precoder with $PMI_2$ is not a submatrix (e.g., scaled submatrix) of that with $PMI_1$. Therefore, a combined use of the CSI feedbacks may be difficult. In case that there is no combination between schedulers residing at different cells (e.g., indoor cells operating in unlicensed spectrum or indoor cells operating in licensed spectrum with non-ideal backhaul), whether the desired UE will experience CLI for a certain time slot is unknown at the scheduler.

Under a proposed scheme in accordance with the present disclosure, considering the receiver model above, one method for CSI feedback and multiple-layer transmission may involve aligning multiple spatial layers with the channel response from a strong interferer. In one time slot, in an event that CLI does not exist, transmissions at all spatial layers may be received with a high success rate. In another time slot, in an event that CLI does exist (e.g., from interfering signal y), as the CLI may be aligned with the interference, some layers may survive while some other layers (e.g., those aligned with the channel response(s) of the interfering signal) may be impacted negatively (e.g., with very low SINR). With the receiver model above, $P_k$ may be chosen or otherwise selected such that $HP_2$ is parallel to G and $HP_1$ is orthogonal to G.

In general, the UE may estimate a subspace G spanned by the channel responses of the interfering signal, $\{G_0, G_1, G_2, \ldots\}$. Here, $G_0, G_1, \ldots$ are for other CLI interfering signals or strong interfering signals in a conventional interference scenario.

Accordingly, the PMI feedback may include two or more parts as represented by the expression below.

$$P=[P_1 P_2],$$

In the expression above, $P_2 \subset \tilde{G}$ or $\tilde{G} \subset P_2$, or there is a non-null subspace belonging to $P_2$ and $\tilde{G}$. In other words, $P_2$ may be aligned with $\tilde{G}$ in some fashion. It is noteworthy that $P_k$ may be vectors or matrices, or matrices of the same or different numbers of columns.

Under the proposed scheme, $P_1$ may be chosen or otherwise selected such that there is as little leakage from $\tilde{G}$ as possible. At the base station, a codeblock (e.g., codeblock 1) may be mapped in an orderly fashion with spatial layer first, frequency second, and time third over spatial layers belonging to $P_1$. Other codeblocks, preferably within the same codeblock group as codeblock 1, may be continuously mapped to those spatial layers in the same manner as codeblock 1. Over spatial layers belonging to $P_2$, a codeblock (e.g., codeblock m) may be mapped in an orderly fashion with spatial layer first, frequency second, and time third. Other codeblocks (e.g., codeblocks m+1, m+2, ...) may be mapped similarly. With such a mapping scheme, it is noteworthy that codeblock decoding errors may tend to be clustered along the spatial layers (e.g., over $P_2$), and decoding error status codeblocks within the same codeblock group may tend to be correlated. It is also noteworthy that the PMI for a given interference case (e.g., low interference case) may be identified by considering the subspace spanned by the interference for another interference case (e.g., high interference case).

Under the proposed scheme, such layer grouping according to $P_1$ and $P_2$ may be conducted with a single CQI by assuming that each layer can support the same spectral efficiency. Moreover, layer grouping according to $P_1$ and $P_2$ may also be feasible in an event that the UE can additionally provide to the base station information related to the signal quality of each layer.

In a wireless network such as a NR network, a CSI report from a UE may include RI, PMI and CQI for a single codeword. The CQI value corresponding to a codeword may be derived under an assumption that the codeword is transmitted over all spatial layers indicated by the RI and PMI. The number of spatial layers may be more than one when the RI value is greater than 1. It is noteworthy that, with given RI and PMI, quality difference among spatial layers cannot be extracted from a single CQI value.

Under the proposed scheme, to provide the base station with enough information to determine how to group spatial layers, the UE may provide additional information on signal quality of each spatial layer, or each spatial layer group, which includes one or more spatial layers. According to one approach under the proposed scheme, the UE may feedback information implying layer indexes in a sorted order based on signal quality of the spatial layers. That is, the UE may feedback to the base station information implying layer indexes in a descending order (e.g., from best to worst) or in an ascending order (e.g., from worst to best) of signal quality of the spatial layers. For instance, a rank-2 PMI and a CQI may be reported under this approach. Additionally, the UE may report indexes in a sorted order (e.g., [2 1]) to indicate to the base station that spatial layer 2 exhibits better quality than spatial layer 1.

The additional information on the quality of each spatial layer/spatial layer group may also be useful in an event that the number of scheduled layers, denoted by $n_s$, is less than RI. This could happen for either single-user multiple-input-and-multiple-output (SU-MIMO) cases or multiple-user multiple-input-and-multiple-output (MU-MIMO) cases. Since a single CQI of a codeword over RI spatial layers implies signal quality averaged over the RI spatial layers, when $n_s$ is less than RI, it is possible that the average signal quality on the $n_s$ scheduled layers is worse than that implied by the reported CQI, while the reported CQI is derived from the average quality for all RI spatial layers. With the additional information on the quality of each spatial layer (e.g., as in the above example in which [2 1] is reported additionally to rank the quality of two spatial layers with RI=2), the base station may determine that it is safe to assign modulation and coding scheme (MCS) according to the reported single CQI in an event that spatial layer 2 is used. On the other hand, the base station may need to adopt a more conservative MCS in an event that spatial layer 1 is used for transmission, because the quality of spatial layer 1 is below average in this example.

According to another approach under the proposed scheme, to provide additional information to the base station regarding the quality of each spatial layer, the UE may directly report signal quality of the spatial layers/spatial layer group(s). To avoid increasing feedback overhead, the UE may feedback quantized values for the signal-to-noise ratio (SNR), CQI, and/or supported spectral efficiency (SE) of each spatial layer/spatial layer group. Alternatively, the UE may feedback quantized values for the differential SNR/CQI/SE of each spatial layer/spatial layer group relative to the CQI reported for each codeword.

It is noteworthy that the additional information regarding spatial layer quality as described above may not be always needed. For example, in a cell with merely a few UEs waiting for service, the additional information regarding spatial layer quality may not be necessary. Accordingly, under the proposed scheme, the base station may request each UE to report by RRC configuration, media access control (MAC) control element (CE), or trigger via a control channel.

Multiple-Bit HARQ Feedback

In a wireless network such as a NR network, a codeword may include one or more codeblocks. Codeblocks may be divided into codeblock group(s). Under a proposed scheme in accordance with the present disclosure, HARQ feedback with multiple bits may be used by a UE to indicate to a base station that some codeblocks are received correctly and, consequently, retransmission can be conducted for other codeblocks which are not received correctly.

Under the proposed scheme, multiple states may be used to indicate frequently encountered error cases. One criterion used may be the number of codeblocks in error (e.g., due to the limited number of feedback bits, up to three codeblocks in error may be indicated in a feedback code state). Codeblock (or codeblock group) mapping may lead to half of the codeblocks (or codeblock groups) to be received correctly (e.g., over spatial layers 1 and 2) with the other half received in error. Under the proposed scheme, feedback states may additionally include error cases often encountered in dynamic TDD. With PMI feedback scheme as described above, the second half of codeblocks in a codeword may be impacted by CLI, and hence the second half of codeblocks in the codeword may be grouped for a code state in a multiple-bit HARQ feedback. In other words, the code state indicates whether the second half of codeblocks are in error or not. Accordingly, it may be assumed that all codeblocks on a spatial layer (or a specific spatial layer group) may be in error.

FIG. 1 illustrates an example scenario 100 of codeblock mapping over a symbol (e.g., an orthogonal frequency-division multiplexing (OFDM) symbol 0) in accordance with an implementation of the present disclosure. FIG. 2 illustrates an example scenario 200 of codeblock mapping over another symbol (e.g., an OFDM symbol 1) in accordance with an implementation of the present disclosure. In both scenarios 100 and 200, b(x,y) stands for the y-th bit in the x-th codeblock. In each of FIG. 1 and FIG. 2, a respective example is provided for codeblock mapping over spatial layer, frequency and time. Specifically, in each of scenario 100 and scenario 200, four spatial layers (i.e., layer 1, layer 2, layer 3 and layer 4) are used for transmission. The spatial layers are divided into two groups: {layer 1, layer 2} in Group 1 with $P_1$ and {layer 3, layer 4} in Group 2 with $P_2$. In this example, one CQI may be fed back from the UE for all spatial layers. The base station may assume each spatial layer supports the same spectral efficiency. One transport block may be encoded into one codeword, e.g., with cyclic redundancy check (CRC) attachment for the codeword), and CRC attachment for codeblocks or codeblock groups, channel encoding, rate matching and so on. In this example, one codeword includes 32 codeblocks, with codeblocks 0~15 mapped to Group 1 and codeblocks 16~31 mapped to Group 2.

Under a proposed scheme in accordance with the present disclosure, for HARQ feedback, codeblocks may be aggregated into codeblock groups. For instance, codeblocks 0~3 may be grouped into a codeblock group 1, codeblocks 4~7 may be grouped into a codeblock group 2, codeblocks 8~11 may be grouped into a codeblock group 3, codeblocks 12~15 may be grouped into a codeblock 4, codeblocks 16~19 may be grouped into a codeblock group 5, codeblocks 20~23 may be grouped into a codeblock group 6, codeblocks 24~27 may be grouped into a codeblock group 7, and codeblocks 28~31 may be grouped into a codeblock 8. As an example, with severe CLI, it could happen that all the codeblocks on some spatial layers may be received in error (e.g., codeblocks 16~31). As another example, it could also happen that a few codeblocks from codeblocks 0~15 are received in error. Accordingly, under the proposed scheme, some code states in the multiple-bit HARQ feedback may be defined to indicate block error(s) and random errors.

Illustrative Implementations

FIG. 3 illustrates an example system 300 having at least an example apparatus 310 and an example apparatus 320 in accordance with an implementation of the present disclosure. Each of apparatus 310 and apparatus 320 may perform various functions to implement schemes, techniques, processes and methods described herein pertaining to layer mapping, CSI feedback and HARQ feedback in mobile communications, including the various schemes described above with respect to various proposed designs, concepts, schemes, systems and methods described above as well as processes 400, 500 and 600 described below.

Each of apparatus 310 and apparatus 320 may be a part of an electronic apparatus, which may be a network apparatus or a UE, such as a portable or mobile apparatus, a wearable apparatus, a wireless communication apparatus or a computing apparatus. For instance, each of apparatus 310 and apparatus 320 may be implemented in a smartphone, a smartwatch, a personal digital assistant, a digital camera, or a computing equipment such as a tablet computer, a laptop computer or a notebook computer. Each of apparatus 310 and apparatus 320 may also be a part of a machine type apparatus, which may be an IoT apparatus such as an immobile or a stationary apparatus, a home apparatus, a wire communication apparatus or a computing apparatus. For instance, each of apparatus 310 and apparatus 320 may be implemented in a smart thermostat, a smart fridge, a smart door lock, a wireless speaker or a home control center. When implemented in or as a network apparatus, apparatus 310 and/or apparatus 320 may be implemented in an eNodeB in a LTE, LTE-Advanced or LTE-Advanced Pro network or in a gNB or TRP in a 5G network, an NR network or an IoT network.

In some implementations, each of apparatus 310 and apparatus 320 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 310 and apparatus 320 may be implemented in or as a network apparatus or a UE. Each of apparatus 310 and apparatus 320 may include at least some of those components shown in FIG. 3 such as a processor 312 and a processor 322, respectively, for example. Each of apparatus 310 and apparatus 320 may further include one or more other components not pertinent to the proposed scheme of the present disclosure (e.g., internal power supply, display device and/or user interface device), and, thus, such component(s) of apparatus 310 and apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including those pertaining to layer mapping, CSI feedback and HARQ feedback in mobile communications in accordance with various implementations of the present disclosure.

In some implementations, apparatus 310 may also include a transceiver 316 coupled to processor 312. Transceiver 316 may be capable of wirelessly transmitting and receiving data. In some implementations, apparatus 320 may also include a transceiver 326 coupled to processor 322. Transceiver 326 may include a transceiver capable of wirelessly transmitting and receiving data.

In some implementations, apparatus 310 may further include a memory 314 coupled to processor 312 and capable of being accessed by processor 312 and storing data therein. In some implementations, apparatus 320 may further include a memory 324 coupled to processor 322 and capable of being accessed by processor 322 and storing data therein. Each of memory 314 and memory 324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 314 and memory 324 may include a type of read-only memory (ROM) such as mask ROM, programmable ROM (PROM), erasable programmable ROM (EPROM) and/or electrically erasable programmable ROM (EEPROM). Alternatively, or additionally, each of memory 314 and memory 324 may include a type of non-volatile random-access memory (NVRAM) such as flash memory, solid-state memory, ferroelectric RAM (Fe-RAM), magnetoresistive RAM (MRAM) and/or phase-change memory.

For illustrative purposes and without limitation, a description of capabilities of apparatus 310, as a UE, and apparatus 320, as a base station, is provided below.

In some implementations, processor 32 of apparatus 310, as a UE, may receive from apparatus 320, as a base station, one or more reference signals, which may be non-zero power (NZP) or zero power (ZP), on one or more time-frequency resources indicated by a network via a communication link between apparatus 310 and apparatus 320. Processor 312 may estimate, based on the receiving, a subspace spanned by a channel response of an interfering signal. Processor 312 may also determine a precoding matrix indicator (PMI) based on the estimated subspace. Processor 312 may further transmit, via transceiver 316, to apparatus 320 a CSI feedback including at least the PMI, which may include at least a first precoder and a second precoder.

In some implementations, the first precoder may be approximately parallel to the channel response of the interfering signal, and the second precoder may be approximately orthogonal to the channel response of the interfering signal.

In some implementations, in determining the PMI based on the estimated subspace, processor 312 may identify the PMI for a subspace not spanned by the channel response of the interfering signal.

In some implementations, the CSI feedback may also include information related to a signal quality of each spatial layer of a plurality of spatial layers with respect to the communication link. In some implementations, the information related to the signal quality of each spatial layer of the plurality of spatial layers with respect to the communication link may include information indicating layer indexes in a sorted order based on signal quality of the plurality of spatial layers. Alternatively, or additionally, the information related to the signal quality of each spatial layer of the plurality of spatial layers with respect to the communication link may include quantized values for a signal-to-noise ratio (SNR), a channel quality indicator (CQI) and/or a supported spectral efficiency (SE) of each spatial layer or each spatial layer group of the plurality of spatial layers. Still alternatively, or additionally, the information related to the signal quality of each spatial layer of the plurality of spatial layers with respect to the communication link may include quantized values for a differential of each of a SNR, a CQI and/or a SE of each spatial layer or each spatial layer group of the plurality of spatial layers relative to a CQI reported for each codeword.

In some implementations, processor 312 may receive, via transceiver 316, from apparatus 320 a first set of codeblocks mapped in an orderly fashion according to a first mapping order with spatial layer first over a first set of spatial layers associated with the first precoder, frequency second, and time third. Moreover, processor 312 may receive, via transceiver 316, from apparatus 320 a second set of codeblocks mapped in an orderly fashion according to a second mapping order with spatial layer first over a second set of spatial layers associated with the second precoder, frequency second, and time third.

In some implementations, processor 312 may transmit, via transceiver 316, to apparatus 320 a HARQ with multiple bits. In some implementations, the HARQ with multiple bits may indicate that a first plurality of codeblocks of a codeword are received correctly or in error and a second plurality of codeblocks of the codeword are received correctly or in error. Alternatively, the HARQ with multiple bits may indicate a code state that indicates whether one or more codeblocks of a codeword are impacted by cross-link interference (CLI) or not. Still alternatively, the HARQ with multiple bits may indicate one or more block errors or one or more random errors.

In some implementations, processor 312 may receive, via transceiver 326, from apparatus 320 data signals over a plurality of spatial layers that are divided into at least a first group and a second group of spatial layers. The first group may be associated with the first precoder, and the second group may be associated with the second precoder.

In some implementations, processor 312 of apparatus 310, as a UE, may receive from apparatus 320, as a base station, one or more reference signals, which may be NZP or ZP, on one or more time-frequency resources indicated by a network via a communication link between apparatus 310 and apparatus 320 with dynamic TDD. Processor 312 may determine a first CSI including rank indication (RI), PMI and CQI for a plurality of time slots associated with a first slot type used for the dynamic TDD. Processor 312 may also determine a second CSI comprising RI, PMI and CQI for a plurality of time slots associated with a second slot type used for the dynamic TDD. Processor 312 may further transmit, via transceiver 316, to apparatus 320 a CSI feedback indicating the first CSI and the second CSI.

In some implementations, the first slot type may correspond to time slots used for the dynamic TDD with light CLI. Moreover, the second slot type may correspond to time slots used for the dynamic TDD with heavy CLI.

In some implementations, processor 312 may also receive, via transceiver 316, from apparatus 320 downlink control information (DCI) in a physical downlink control channel (PDCCH). Moreover, processor 312 may derive, based on the PDCCH, a respective slot type for each time slot of at least some of the plurality of time slots. In deriving the respective slot type for each time slot of at least some of the plurality of time slots, processor 312 may derive the first slot type for the first slot type of time slots and derive the second slot type for the second lot type of time slots.

In some implementations, processor 312 may also receive, via transceiver 316, from apparatus 320 radio resource control (RRC) signaling. Additionally, processor 312 may derive, based on the RRC signaling, a respective slot type for each time slot of at least some of the plurality of time slots. In deriving the respective slot type for each time slot of at least some of the plurality of time slots, processor 312 may derive the first slot type for the first slot type of time slots and derive the second slot type for the second lot type of time slots.

In some implementations, processor 322 of apparatus 320, as a base station, may transmit, via transceiver 326, to apparatus 310, as a UE, one or more reference signals, which may be NZP or ZP, on one or more time-frequency resources indicated by a network via a communication link between apparatus 310 and apparatus 320 with dynamic TDD. Moreover, processor 322 may receive, via transceiver 326, from apparatus 310 a CSI feedback including at least a PMI. The PMI may include at least a first precoder and a second precoder. The first precoder may be approximately parallel to a channel response of an interfering signal. The second precoder may be approximately orthogonal to the channel response of the interfering signal.

In some implementations, the CSI feedback may also include information related to a signal quality of each spatial layer of a plurality of spatial layers with respect to the communication link. In some implementations, the information related to the signal quality of each spatial layer of the plurality of spatial layers with respect to the communication link may include one or more of the following: (1) information indicating layer indexes in a sorted order based on signal quality of the plurality of spatial layers; (2) quantized values for a SNR, a CQI and/or a SE of each spatial layer or each spatial layer group of the plurality of spatial layers; and (3) quantized values for a differential of each of a SNR, a CQI and/or a SE of each spatial layer or each spatial layer group of the plurality of spatial layers relative to a CQI reported for each codeword.

In some implementations, processor 322 may transmit, via transceiver 326, to apparatus 310 a first set of codeblocks mapped in an orderly fashion according to a first mapping order with spatial layer first over a first set of spatial layers associated with the first precoder, frequency second, and time third. Additionally, processor 322 may transmit, via transceiver 326, to apparatus 310 a second set of codeblocks mapped in an orderly fashion according to a second mapping order with spatial layer first over a second set of spatial layers associated with the second precoder, frequency second, and time third.

In some implementations, processor 322 may receive, via transceiver 326, from apparatus 310 a HARQ with multiple bits indicating one of: (a) a first plurality of codeblocks of a codeword are received correctly or in error and a second plurality of codeblocks of the codeword are received correctly or in error; (b) a code state that indicates whether one or more codeblocks of a codeword are impacted by CLI or not; or (c) a code state that indicates one or more block errors or one or more random errors.

Illustrative Processes

FIG. 4 illustrates an example process 400 in accordance with an implementation of the present disclosure. Process 400 may represent an aspect of implementing CSI acquisition in mobile communications, including the various schemes described above with respect to various proposed designs, concepts, schemes, systems and methods described above. More specifically, process 400 may represent an aspect of the proposed concepts and schemes pertaining to layer mapping, CSI feedback and HARQ feedback in mobile communications. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation.

Moreover, the blocks/sub-blocks of process 400 may be executed in the order shown in FIG. 4 or, alternatively in a different order. The blocks/sub-blocks of process 400 may be executed iteratively. Process 400 may be implemented by or in apparatus 310 and apparatus 320 as well as any variations thereof. Solely for illustrative purposes and without limiting the scope, process 400 is described below in the context of apparatus 310 as a UE and apparatus 320 as a base station. Process 400 may begin at block 410.

At 410, process 400 may involve processor 312 of apparatus 310 receiving, via transceiver 316, from apparatus 320 one or more reference signals, which may be non-zero power (NZP) or zero power (ZP), on one or more time-frequency resources indicated by a network via a communication link between apparatus 310 and apparatus 320. Process 400 may proceed from 410 to 420.

At 420, process 400 may involve processor 312 estimating, based on the receiving, a subspace spanned by a channel response of an interfering signal. Process 400 may proceed from 420 to 430.

At 430, process 400 may involve processor 312 determining a PMI based on the estimated subspace. Process 400 may proceed from 430 to 440.

At 440, process 400 may involve processor 312 transmitting, via transceiver 316, to apparatus 320 a CSI feedback including at least the PMI, which may include at least a first precoder and a second precoder.

In some implementations, the first precoder may be approximately parallel to the channel response of the interfering signal, and the second precoder may be approximately orthogonal to the channel response of the interfering signal.

In some implementations, in determining the PMI based on the estimated subspace, process 400 may involve processor 312 identifying the PMI for a subspace not spanned by the channel response of the interfering signal.

In some implementations, the CSI feedback may also include information related to a signal quality of each spatial layer of a plurality of spatial layers with respect to the communication link. In some implementations, the information related to the signal quality of each spatial layer of the plurality of spatial layers with respect to the communication link may include information indicating layer indexes in a sorted order based on signal quality of the plurality of spatial layers. Alternatively, or additionally, the information related to the signal quality of each spatial layer of the plurality of spatial layers with respect to the communication link may include quantized values for a SNR, a CQI and/or a SE of each spatial layer or each spatial layer group of the plurality of spatial layers. Still alternatively, or additionally, the information related to the signal quality of each spatial layer of the plurality of spatial layers with respect to the communication link may include quantized values for a differential of each of a SNR, a CQI and/or a SE of each spatial layer or each spatial layer group of the plurality of spatial layers relative to a CQI reported for each codeword.

In some implementations, process 400 may involve processor 312 receiving, via transceiver 316, from apparatus 320 a first set of codeblocks mapped in an orderly fashion according to a first mapping order with spatial layer first over a first set of spatial layers associated with the first precoder, frequency second, and time third. Additionally, process 400 may involve processor 312 receiving, via transceiver 316, from apparatus 320 a second set of codeblocks mapped in an orderly fashion according to a second mapping order with spatial layer first over a second set of spatial layers associated with the second precoder, frequency second, and time third.

In some implementations, process 400 may also involve processor 312 transmitting, via transceiver 316, to apparatus 320 a HARQ with multiple bits. In some implementations, the HARQ with multiple bits may indicate that a first plurality of codeblocks of a codeword are received correctly or in error and a second plurality of codeblocks of the codeword are received correctly or in error. Alternatively, the HARQ with multiple bits may indicate a code state that indicates whether one or more codeblocks of a codeword are impacted by CLI or not. Still alternatively, the HARQ with multiple bits may indicate a code state that indicates one or more block errors or one or more random errors.

In some implementations, process 400 may further involve processor 312 receiving, via transceiver 316, from apparatus 320 data signals over a plurality of spatial layers that are divided into at least a first group and a second group of spatial layers. The first group may be associated with the first precoder, and the second group may be associated with the second precoder.

FIG. 5 illustrates an example process 500 in accordance with an implementation of the present disclosure. Process 500 may represent an aspect of implementing CSI acquisition in mobile communications, including the various schemes described above with respect to various proposed designs, concepts, schemes, systems and methods described above. More specifically, process 500 may represent an aspect of the proposed concepts and schemes pertaining to layer mapping, CSI feedback and HARQ feedback in mobile communications. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. The blocks/sub-blocks of process 500 may be executed iteratively. Process 500 may be implemented by or in apparatus 310 and apparatus 320 as well as any variations thereof. Solely for illustrative purposes and without limiting the scope, process 500 is described below in the context of apparatus 310 as a UE and apparatus 320 as a base station. Process 500 may begin at block 510.

At 510, process 500 may involve processor 312 of apparatus 310 receiving, via transceiver 316, from apparatus 320 one or more reference signals, which may be NZP or ZP, on one or more time-frequency resources indicated by a network via a communication link between apparatus 310 and apparatus 320 with dynamic TDD. Process 500 may proceed from 510 to 520.

At 520, process 500 may involve processor 312 determining a first CSI including RI, PMI and CQI for a plurality of time slots associated with a first slot type used for the dynamic TDD. Process 500 may proceed from 520 to 530.

At 530, process 500 may involve processor 312 determining determine a second CSI comprising RI, PMI and CQI for a plurality of time slots associated with a second slot type used for the dynamic TDD. Process 500 may proceed from 530 to 540.

At 540, process 500 may involve processor 312 transmitting, via transceiver 316, to apparatus 320 a CSI feedback indicating the first CSI and the second CSI.

In some implementations, the first slot type may correspond to time slots used for the dynamic TDD with light CLI. Moreover, the second slot type may correspond to time slots used for the dynamic TDD with heavy CLI.

In some implementations, process 500 may also involve processor 312 receiving, via transceiver 316, from apparatus 320 DCI in a PDCCH. Moreover, process 500 may further involve processor 312 deriving, based on the PDCCH, a respective slot type for each time slot of at least some of the plurality of time slots. In deriving the respective slot type for each time slot of at least some of the plurality of time slots, process 500 may involve processor 312 deriving the first slot type for the first slot type of time slots and derive the second slot type for the second lot type of time slots.

In some implementations, process 500 may involve processor 312 receiving, via transceiver 316, from apparatus 320 RRC signaling. Additionally, process 500 may involve processor 312 deriving, based on the RRC signaling, a respective slot type for each time slot of at least some of the plurality of time slots. In deriving the respective slot type for each time slot of at least some of the plurality of time slots, process 500 may involve processor 312 deriving the first slot type for the first slot type of time slots and derive the second slot type for the second slot type of time slots.

FIG. 6 illustrates an example process 600 in accordance with an implementation of the present disclosure. Process 600 may represent an aspect of implementing CSI acquisition in mobile communications, including the various schemes described above with respect to various proposed designs, concepts, schemes, systems and methods described above. More specifically, process 600 may represent an aspect of the proposed concepts and schemes pertaining to layer mapping, CSI feedback and HARQ feedback in mobile communications. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. The blocks/sub-blocks of process 600 may be executed iteratively. Process 600 may be implemented by or in apparatus 310 and apparatus 320 as well as any variations thereof. Solely for illustrative purposes and without limiting the scope, process 600 is described below in the context of apparatus 310 as a UE and apparatus 320 as a base station. Process 600 may begin at block 610.

At 610, process 600 may involve processor 322 of apparatus 320 transmitting, via transceiver 326, to apparatus 310 one or more reference signals, which may be NZP or ZP, on one or more time-frequency resources indicated by a network via a communication link between apparatus 310 and apparatus 320 with dynamic TDD. Process 600 may proceed from 610 to 620.

At 620, process 600 may involve processor 322 receiving, via transceiver 326, from apparatus 310 a CSI feedback including at least a PMI. The PMI may include at least a first precoder and a second precoder. The first precoder may be approximately parallel to a channel response of an interfering signal. The second precoder may be approximately orthogonal to the channel response of the interfering signal.

In some implementations, the CSI feedback may also include information related to a signal quality of each spatial layer of a plurality of spatial layers with respect to the communication link. In some implementations, the information related to the signal quality of each spatial layer of the plurality of spatial layers with respect to the communication link may include one or more of the following: (1) information indicating layer indexes in a sorted order based on signal quality of the plurality of spatial layers; (2) quantized values for a SNR, a CQI and/or a SE of each spatial layer or each spatial layer group of the plurality of spatial layers; and (3) quantized values for a differential of each of a SNR, a CQI and/or a SE of each spatial layer or each spatial layer group of the plurality of spatial layers relative to a CQI reported for each codeword.

In some implementations, process 600 may also involve processor 322 transmitting, via transceiver 326, to apparatus 310 a first set of codeblocks mapped in an orderly fashion according to a first mapping order with spatial layer first over a first set of spatial layers associated with the first precoder, frequency second, and time third. Moreover, process 600 may involve processor 322 transmitting, via transceiver 326, to apparatus 310 a second set of codeblocks mapped in an orderly fashion according to a second mapping order with spatial layer first over a second set of spatial layers associated with the second precoder, frequency second, and time third.

In some implementations, process 600 may also involve processor 322 receiving, via transceiver 326, from apparatus 310 a HARQ with multiple bits indicating one of: (a) a first plurality of codeblocks of a codeword are received correctly or in error and a second plurality of codeblocks of the codeword are received correctly or in error; (b) a code state that indicates whether one or more codeblocks of a codeword are impacted by CLI or not; or (c) a code state that indicates one or more block errors or one or more random errors.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    communicating, by a processor of a user equipment (UE), with a base station of a network via a communication link;
    receiving, by the processor, from the base station one or more reference signals, which are non-zero power (NZP) or zero power (ZP), on one or more time-frequency resources indicated by the network via the communication link between the UE and the base station;
    estimating, by the processor based on the receiving, a subspace spanned by a channel response of an interfering signal;
    determining, by the processor, a precoding matrix indicator (PMI) based on the estimated subspace; and
    transmitting, by the processor, to the base station a channel state information (CSI) feedback comprising at least the PMI,
    wherein the CSI feedback further comprises information related to a signal quality of each spatial layer of a plurality of spatial layers with respect to the communication link by indicating one or more than one layer indexes sorted in a sorted order based on signal quality of the plurality of spatial layers such that:
        when the sorted order is a descending order, a first index value for a first spatial layer having a higher signal quality is reported before a second index value for a second spatial layer having a lower signal quality, and
        when the sorted order is an ascending order, the second index value for a third spatial layer having the lower signal quality is reported before the first index value for a fourth spatial layer having the higher signal quality.

2. The method of claim 1, wherein the PMI comprises at least a first precoder and a second precoder, and wherein the first precoder is approximately parallel to the channel response of the interfering signal, and wherein the second precoder is approximately orthogonal to the channel response of the interfering signal.

3. The method of claim 1, wherein the information related to the signal quality of each spatial layer of the plurality of spatial layers with respect to the communication link comprises quantized values for a signal-to-noise ratio (SNR), a channel quality indicator (CQI) or a supported spectral efficiency (SE) of each spatial layer or each spatial layer group of the plurality of spatial layers.

4. The method of claim 1, wherein the information related to the signal quality of each spatial layer of the plurality of spatial layers with respect to the communication link comprises quantized values for a differential of a signal-to-noise ratio (SNR), a channel quality indicator (CQI) or a supported spectral efficiency (SE) of each spatial layer or each spatial layer group of the plurality of spatial layers relative to a SNR, a CQI or a SE reported for each codeword.

5. The method of claim 2, further comprising:
    receiving, by the processor, from the base station a first set of codeblocks mapped in an orderly fashion according to a first mapping order with spatial layer first over a first set of spatial layers associated with the first precoder, frequency second, and time third; and
    receiving, by the processor, from the base station a second set of codeblocks mapped in an orderly fashion according to a second mapping order with spatial layer first over a second set of spatial layers associated with the second precoder, frequency second, and time third.

6. The method of claim 5, further comprising:
    transmitting, by the processor, to the base station a hybrid automatic repeat request (HARQ) with multiple bits indicating that a first plurality of codeblocks of a codeword are received correctly or in error and a second plurality of codeblocks of the codeword are received correctly or in error.

7. The method of claim 5, further comprising:
    transmitting, by the processor, to the base station a hybrid automatic repeat request (HARQ) with multiple bits indicating a code state that indicates whether one or more codeblocks of a codeword are impacted by cross-link interference (CLI) or not.

8. The method of claim 5, further comprising:
transmitting, by the processor, to the base station a hybrid automatic repeat request (HARQ) with multiple bits indicating a code state that indicates one or more block errors or one or more random errors.

9. The method of claim 1, further comprising:
receiving, by the processor, from the base station data signals over a plurality of spatial layers that are divided into at least a first group and a second group of spatial layers,
wherein the first group is associated with the first precoder, and
wherein the second group is associated with the second precoder.

10. A method, comprising:
communicating, by a processor of a user equipment (UE), with a base station of a network via a communication link using dynamic time-division duplexing (TDD);
receiving, by the processor, from the base station one or more reference signals, which are non-zero power (NZP) or zero power (ZP), on one or more time-frequency resources indicated by the network via the communication link between the UE and the base station with dynamic TDD;
determining, by the processor, first channel state information (CSI) comprising rank indication (RI), precoding matrix indicator (PMI) and channel quality indicator (CQI) for a plurality of time slots associated with a first slot type used for the dynamic TDD;
determining, by the processor, second CSI comprising RI, PMI and CQI for a plurality of time slots associated with a second slot type used for the dynamic TDD different from the first slot type; and
transmitting, by the processor, to the base station a CSI feedback indicating the first CSI and the second CSI,
wherein the determining of the PMI comprises identifying the PMI for a subspace not spanned by a channel response of an interfering signal.

11. The method of claim 10, wherein the first slot type corresponds to time slots used for the dynamic TDD with light cross-link interference (CLI), and wherein the second slot type corresponds to time slots used for the dynamic TDD with heavy CLI.

12. The method of claim 10, further comprising:
receiving, by the processor, from the base station downlink control information (DCI) in a physical downlink control channel (PDCCH); and
deriving, by the processor based on the PDCCH, a respective slot type for each time slot of at least some of the plurality of time slots.

13. The method of claim 10, further comprising:
receiving, by the processor, from the base station radio resource control (RRC) signaling; and
deriving, by the processor based on the RRC signaling, a respective slot type for each time slot of at least some of the plurality of time slots.

14. A method, comprising:
communicating, by a processor of a base station of a network, with a user equipment (UE) via a communication link using dynamic time-division duplexing (TDD);
transmitting, by the processor, to the UE one or more reference signals, which are non-zero power (NZP) or zero power (ZP), on one or more time-frequency resources indicated by the network via the communication link between the UE and the base station with dynamic TDD; and
receiving, by the processor, from the UE a channel state information (CSI) feedback comprising at least a precoding matrix indicator (PMI),
wherein the PMI comprises at least a first precoder and a second precoder,
wherein the first precoder is approximately parallel to a channel response of an interfering signal,
wherein the second precoder is approximately orthogonal to the channel response of the interfering signal, and
wherein the CSI feedback further comprises information related to a signal quality of each spatial layer of a plurality of spatial layers with respect to the communication link by indicating one or more than one layer indexes sorted in a sorted order based on signal quality of the plurality of spatial layers such that:
when the sorted order is a descending order, a first index value for a first spatial layer having a higher signal quality is reported before a second index value for a second spatial layer having a lower signal quality, and
when the sorted order is an ascending order, the second index value for a third spatial layer having the lower signal quality is reported before the first index value for a fourth spatial layer having the higher signal quality.

15. The method of claim 14, wherein the information related to the signal quality of each spatial layer of the plurality of spatial layers with respect to the communication link further comprises one or more of:
quantized values for a signal-to-noise ratio (SNR), a channel quality indicator (CQI) or a supported spectral efficiency (SE) of each spatial layer or each spatial layer group of the plurality of spatial layers; and
quantized values for a differential of each of a SNR, a CQI or a SE of each spatial layer or each spatial layer group of the plurality of spatial layers relative to a CQI reported for each codeword.

16. The method of claim 14, further comprising:
transmitting, by the processor, to the UE a first set of codeblocks mapped in an orderly fashion according to a first mapping order with spatial layer first over a first set of spatial layers associated with the first precoder, frequency second, and time third; and
transmitting, by the processor, to the UE a second set of codeblocks mapped in an orderly fashion according to a second mapping order with spatial layer first over a second set of spatial layers associated with the second precoder, frequency second, and time third.

17. The method of claim 14, further comprising:
receiving, by the processor, from the UE a hybrid automatic repeat request (HARQ) with multiple bits indicating one of:
a first plurality of codeblocks of a codeword are received correctly or in error and a second plurality of codeblocks of the codeword are received correctly or in error;
a first code state that indicates whether one or more codeblocks of a codeword are impacted by cross-link interference (CLI) or not; or
a second code state that indicates one or more block errors or one or more random errors.

* * * * *